Feb. 13, 1962 A. W. VINAL 3,021,511

MAGNETIC MEMORY SYSTEM

Filed Dec. 19, 1958 4 Sheets-Sheet 1

INVENTOR.
ALBERT W. VINAL

BY Ralph R Barnard

ATTORNEY

MAGNETIC MEMORY SYSTEM

Filed Dec. 19, 1958

4 Sheets-Sheet 2

MAGNETIC MEMORY SYSTEM

Filed Dec. 19, 1958 4 Sheets-Sheet 3

Feb. 13, 1962 A. W. VINAL 3,021,511

MAGNETIC MEMORY SYSTEM

Filed Dec. 19, 1958 4 Sheets-Sheet 4

3,021,511

MAGNETIC MEMORY SYSTEM

Albert W. Vinal, Owego, N.Y., assignor to International Business Machines Corporation, New York, N.Y., a corporation of New York Filed Dec. 19, 1958, Ser. No. 781,797
5 Claims. (Cl. 340—174)

The present invention relates to means for electrically storing digital information and more particularly to a new and improved electrical instrumentation of a ferrite memory system.

The two directions of magnetic remanence of a magnetic core provide two bistable conditions which may represent a bit of binary information. The prior art has recognized these potentialities and, as a result, has utilized an array of toroidal cores, each spaced and oriented with respect to the other in accordance with rectangular coordinates for the purpose of providing a high-capacity, high-speed, random access memory. Therein, the magnetic state of each toroidal core represents a bit of electrical information. Address windings are passed through each core, and the switching characteristics of the hysteresis loop of each participates in the addressing during the selection of that core for purposes of writing in or reading out binary electrical information.

The making, testing and assemblying of these individual core arrays became an uneconomical task when the number of cores were increased to increase the capacities of the memories. In addition, the core arrays were structurally unsound in that the position of one core with respect to another could be relatively, easily modified by mechanical vibration. Furthermore, the electrical power requirement for modifying the state of saturation in the individual cores was quite high.

As a result of the above, Radio Corporation of America developed a modified magnetic memory comprising discrete cells of ferrite integrally formed into one solid slab (plate) with each ferrite cell having a hole or aperture passing therethrough. Each plate then acts as a core memory plane in a manner very similar to that provided by the rectangular memory plane of cores according to the prior art. This structure is known as a ferrite apertured plate and is described in considerable detail in an article entitled "Ferrite Apertured Plate for Random Access Memory," published in the Proceedings of the IRE, page 325, volume 45. This ferrite apertured plate may be mounted in a cooperative relationship with additional ferrite apertured plates to provide a bistable memory system with a relatively large capacity. Such construction provides a strong, mechanical structure which will withstand considerable vibration without adverse effects when mounted in a suitable holder. The physical dimensions of ferrite apertured plate storage is considerably less than a toroidal core plane storage of equal capacity. Moreover, the apertured plates arranged in this manner require considerably less current during the writing and reading operations. Notwithstanding the other advantages, the ferrite apertured plate storage requires comparatively little labor and cost in its manufacture because of the relative ease of construction. One of the reasons for this is the axial registry of the corresponding apertures of adjacent plates such that two coordinate address wires may be passed therethrough.

As described in the above-identified publication, a third winding is effectively passed serially through each aperture of each plate by utilizing a printed circuit technique. During the writing cycle, a current pulse of one polarity, with half the magnitude necessary to reversibly change the direction of the magnetic saturation of each ferrite cell, is selectively applied through each of the coordinate access wires of a particular apertured cell. Moreover, an inhibit current pulse of the other polarity, having half the magnitude necessary to reversibly change the direction of magnetic saturation, is applied to the third winding whenever it is desired that the addressed or selected apertured cell not change its state of magnetic saturation in accordance with the binary bit being written into storage.

On the other hand, during the read cycle, a current pulse of the other polarity, with half the magnitude necessary to reversibly change the direction of magnetic saturation of a ferrite aperture, is selectively applied through each of the coordinate address wires for the selected aperture. Any change of magnetic saturation of the ferrite aperture is detected by a voltage being induced in the third (printed) wire. The read cycle address pulses should be in a proper direction to change the state of saturation depending upon whether or not the ferrite aperture was storing a binary bit represented by a condition of magnetic saturation, which can be changed by the application of the reading address pulses.

Except where there is a coincidence of the two coordinate read or write address pulses at a particular apertured cell, the read and write address pulses being applied to the coordinate address conductor have only half the magnitude necessary to change the condition of magnetic saturation for each of the ferrite apertured cells through which the address wires pass. These latter apertured cells are driven only halfway toward the other condition of magnetic saturation for the duration of the read or write current address pulses. Then they are returned to their initial remanent condition. These flux changes cause incremental induced voltages in the series connecting third (printed) winding, having an instantaneous sum which may be very large compared to the voltage induced therein, by the change of the coincidentally addressed apertured cell from a magnetic remanent condition of a first polarity to the magnetic remanent condition of the other polarity. Each of these unwanted induced voltages is referred to as a half-select noise voltage and may be collectively represented by a total voltage which will be many times the desired signal during the read operation. As a result, it is often difficult to detect the presence of the desired signal. To overcome this problem, the RCA publication referred to above describes the use of a second ferrite apertured plate identical with the first, except that the third winding of each is connected with respect to the other through a differential means so that the half-select noise voltage which is generated in each will be equal and opposite; whereas, the desired signal is not. Such a core memory requires two ferrite apertured plates for each bit stored in the memory.

Moreover, because each of the ferrite apertured cells does not have a hysteresis loop with as high a degree of squareness as the toroidal cores, the magnitude of the address currents providing the half-selection for each coordinate have to be controlled with a high degree of accuracy. Otherwise, considerable noise would be generated during the readout operation, and the reliability with which the coincident half-addressed current pulses change the state of the selected ferrite aperture would not be adequate. The copending application 770,667, filed October 30, 1958, entitled "Binary Memory System," A. W. Vinal, inventor, and assigned to the assignee of the present application describes a technique which utilizes one read-write driver for all of the address conductors along each coordinate in a manner such that the address current pulse amplitude is controlled to a very high degree of accuracy by utilizing a feedback technique.

This technique is generally satisfactory; however, it does have many disadvantages. One of these disadvantages is that two apertured plates are necessary in order to define a binary bit of information and, at the same time, reject the half-addressed voltages generated during the readout operation. Moreover, the capacity of the memory system described in copending application No. 770,667 is determined by the number of apertured cells which may be included in each plate. The number of apertured cells which may be included in each plate is in turn limited by the manufacturing process of the ferrite apertured plates and by the maximum number of address conductors and corresponding transformer switches which may be connected to operate with one feedback type read-write driver.

Accordingly, the present invention teaches a technique for increasing the number of ferrite apertured cells available in the memory and, at the same time, require only one apertured plate for a bit of binary information desired to be stored in the memory. This technique may be used in a memory system which incorporates all of the advantages obtained by the use of one feedback type read-write driver for a substantial number of addressing conductors. Furthermore, according to the teachings of the present invention, as the size of the ferrite memory is increased, the component count of the addressing reading and writing instrumentation is not proportionally increased.

It is, therefore, a primary object of the present invention to provide new and improved electrical instrumentation for a ferrite memory system.

It is another object of the present invention to provide new and improved electrical instrumentation for a ferrite memory system having a very large capacity.

It is still another object of the present invention to provide a new and improved ferrite memory system which utilizes one ferrite apertured plate for each bit of a word of digital information to be stored therein.

It is an additional object of the present invention to provide a new and improved electrical instrumentation for a ferrite memory which has a very large capacity and, at the same time, utilizes one ferrite apertured plate for each bit within a word of digital information being stored.

It is yet another object of the present invention to provide a ferrite memory system utilizing a time-sharing technique during the reading operation to reduce the instrumentation component count.

Other objects of the invention will be pointed out in the following description and claims and illustrated in the accompanying drawings which disclose, by way of examples, the principle of the invention and the best mode which has been contemplated of applying that principle.

Figure 2:
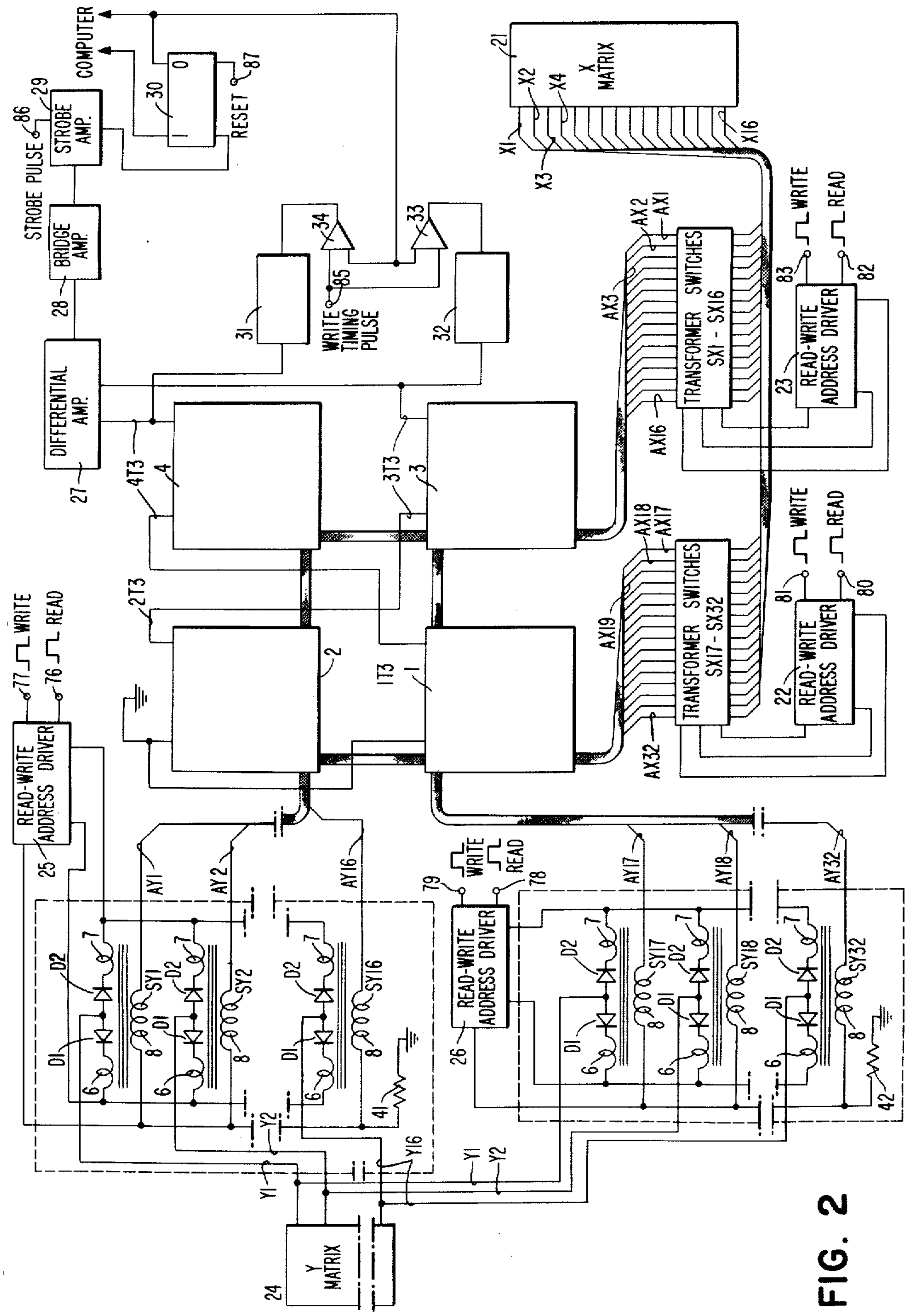
FIG. 2 shows an over-all electrical block diagram of an electrical addressing system as applied to a ferrite memory system according to the present invention.
Figure 3:
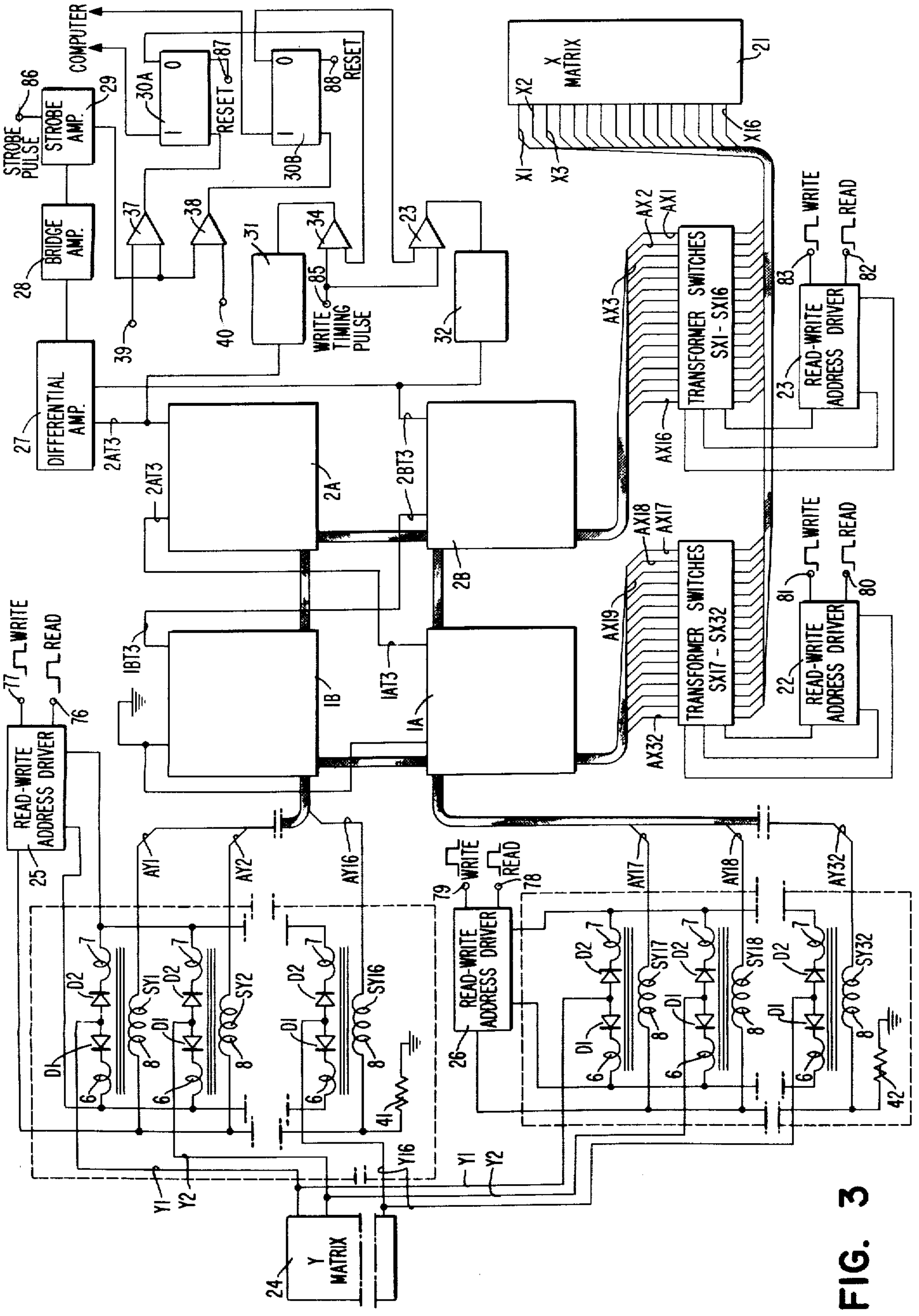
FIG. 3 shows the application of a time-sharing technique to a memory system similar to that shown in FIG. 2.
Figure 5:
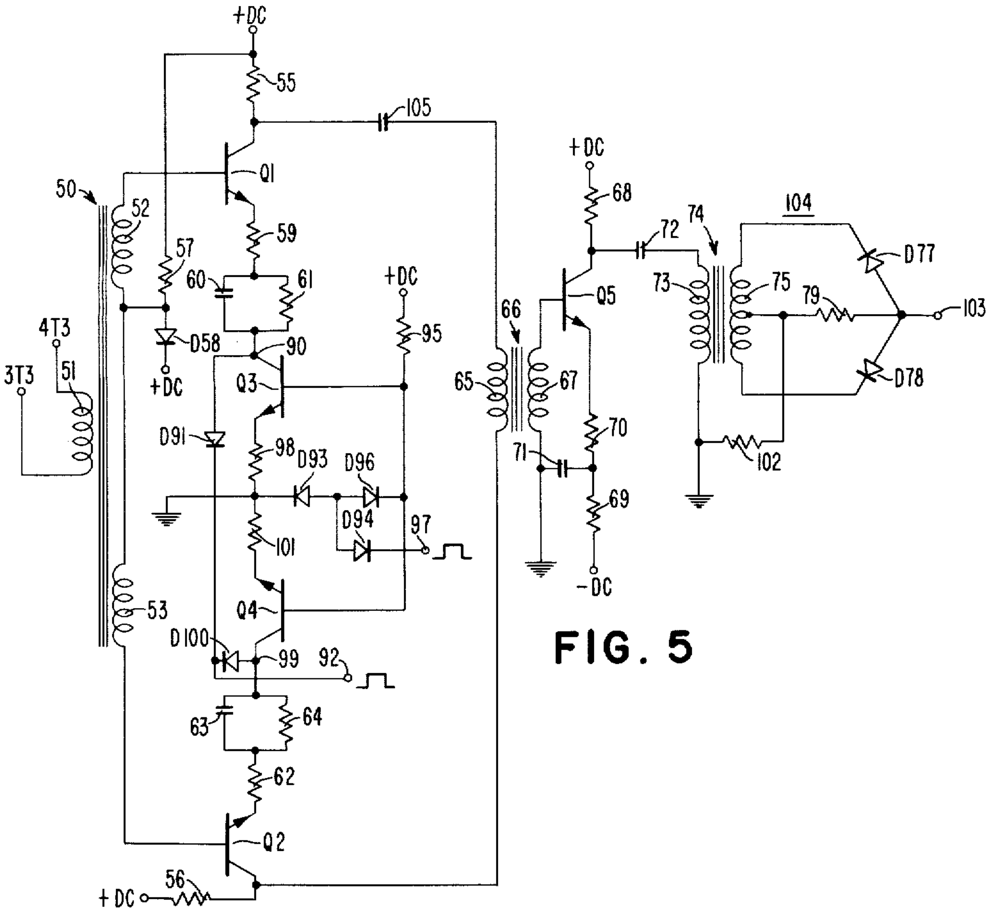
Figure 4:
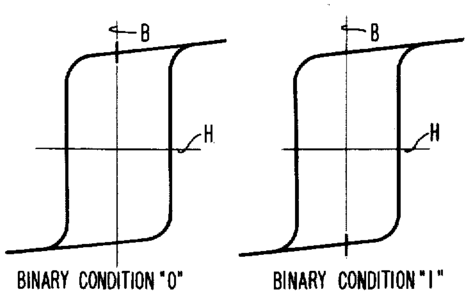

FIG. 4 shows two typical hysteresis loops for defining the binary conditions being stored within a ferrite memory system according to the present invention; and FIG. 5 shows an exemplary electrical schematic for differential amplifier 27 and a bridge amplifier 28 of FIGS. 2 and 3.

Identical components shown in more than one figure will be referred to by the same reference numerals.

Figure 1:
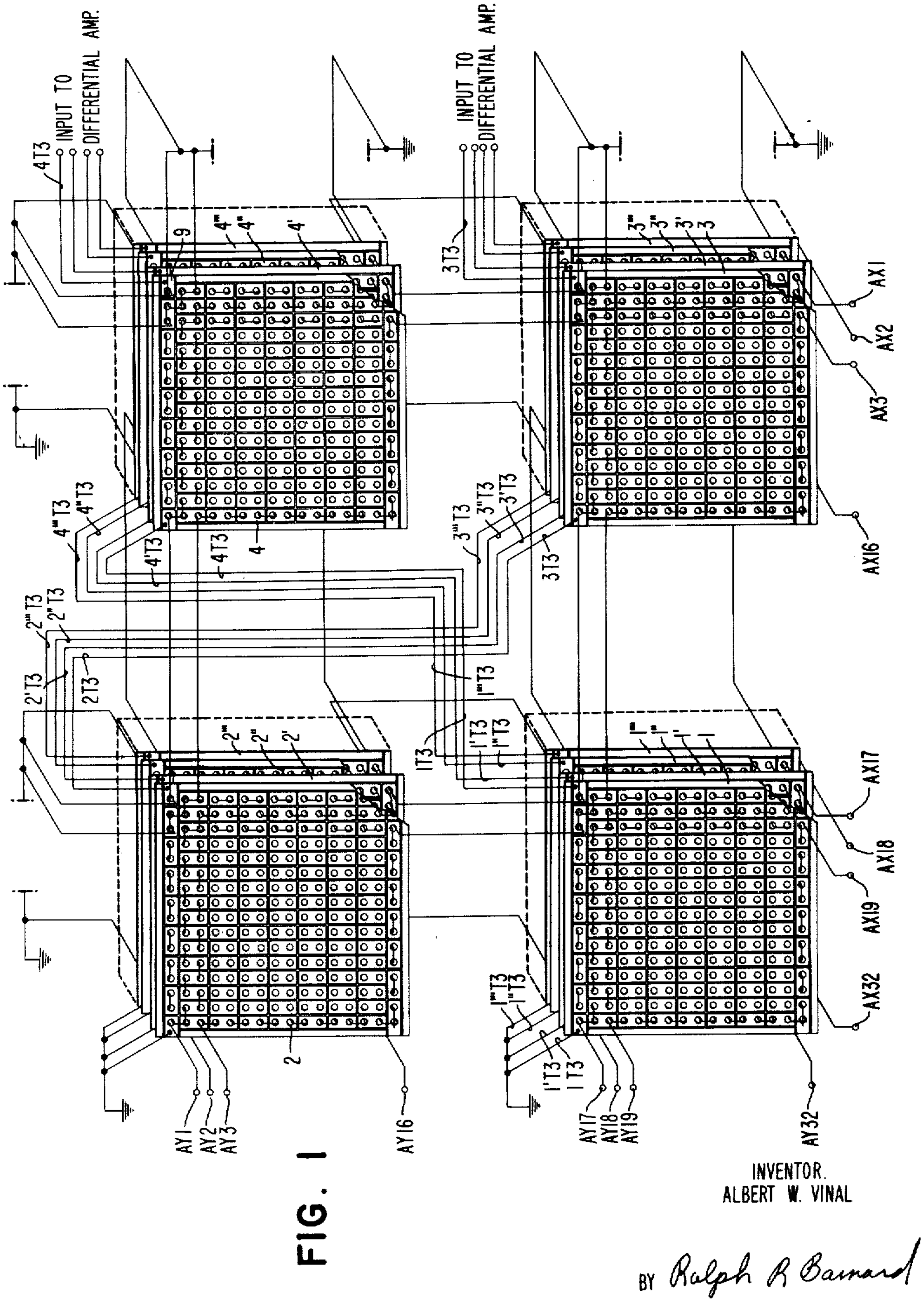
FIG. 1 is a relatively detailed showing of the ferrite memory system comprising four groups of ferrite apertured plates physically arranged with respect to the addressing conductors and electrically connected via third windings so as to provide a large capacity and, at the same time, provide for the cancellation of half-address noise voltages.

Briefly, as shown in FIG. 1, the present invention provides a high-capacity, magnetic memory system comprising many ferrite apertured cells where all of the apertured cells for storing corresponding bits of the words of digital information are included in four ferrite apertured plates 1, 2, 3 and 4. Behind each of these four plates are additional ferrite apertured plates 1′, 2′, 3′ and 4′ (1″, 2″, 3″ and 4″), etc. equal in number to the number of bits in the binary coded words to be stored. A winding is printed on each of these plates so as to effectively pass a combined inhibit and sense winding serially through each of the apertures of each of these plates. Hereinafter, each of these combined inhibit and sense windings will be referred to as a third winding; identified as 1T3 for plate 1, 2T3 for plate 2; 3T3 for plate 3; 4T3 for plate 4; and 1′T3 for plate 1′, etc.

Plural X address conductors AX1 through AX32 are then each passed serially through all of the apertured cells having an identical X coordinate, and plural Y address conductors AY1 through AY32 are then each passed serially through all of the apertured cells having an identical Y coordinate. Accordingly, when read-write means, such as that shown in FIG. 2, are utilized for coincidentally passing an address current pulse through both the AX and AY conductors passing through an apertured cell, that apertured cell is coincidentally addressed and driven to a magnetic remanent condition corresponding to the polarity of the coincident current pulses. At the same time, all of the apertured cells having either the same X or the same Y coordinate are only half-addressed, and these cells remain in their initial remanent condition.

Since each of the half-addressed apertured cells induce a half-addressed voltage disturbance within the third winding of the plate associated therewith which must be cancelled out, it is a fundamental teaching of the present invention that a particular connection of the third windings of plates 1, 2, 3 and 4 (plates 1′, 2′, 3′ and 4′, etc.) may be made so as to cancel the unwanted voltages. For example, if the third winding 2T3 of plate 2 is connected in series with the third winding 3T3 of plate 3, and the third winding 1T3 of plate 1 is connected in series with the third winding 4T3 of plate 4, an equal total half-addressed voltage is induced in each. Therefore, if each of these series connections is connected to a differential device, the unwanted half-addressed voltages are substantially cancelled.

As shown in FIG. 1, the third windings of plates 1′, 2′, 3′ and 4′, 1″, 2″, 3″ and 4″, etc. are similarly electrically connected so that unwanted half-address noise voltages are cancelled in a corresponding differential device. For example, 2′T3 is connected in series with 4′T3, and 1′T3 is connected in series with 4′T3, etc.

While ferrite apertured plates have been shown in FIG. 1, it should be understood that this technique for appropriately connecting the third windings of four groups of memory cells to provide for cancellation of the unwanted half-addressed voltages could be equally applicable to toroidal cores arranged in a manner similar to that of a ferrite apertured plate. Furthermore, whether the third winding is of the printed type is a matter of choice, inasmuch as an equivalent third winding could have been threaded serially through each of the apertures.

As indicated hereinabove, the number of apertured cells contained within each ferrite plate is limited by the method of manufacture of these plates. Also, the use of a single read-write driver to selectively energize one of plural addressing conductor-transformer switch combinations is limited under the best operating conditions. In addition, the number of addressing conductor-transformer switch combinations, which may selectively be energized by a single read-write driver, is limited under the best operating conditions.

Therefore, it is a part of the teachings of the present invention that the capacity of the memory be increased by increasing the number of apertured plates along each coordinate and by using one read-write driver for the address conductor-transformer switch combinations associated with each apertured plate along each coordinate, as shown in FIG. 2. Because the logic read and write pulse applied to each read-write driver may be part of the addressing circuits, the same X matrix 21 may be utilized to simultaneously and operatively connect a corresponding X address conductor of plates 1 and 3 to read-write drivers 22 and 23, respectively. Hence, the selection of one of these read-write drivers by the application of either a read or write logic pulse will determine which of the corresponding address conductors of plates 1 and 3 is addressed. It should be made clear that the X coordinate diode matrix 21 may cooperate with additional plates (groups of plates), like plates 1 and 3, if it is desirable that the capacity of the memory be further increased.

Similarly, Y matrix 24 may be utilized to simultaneously and operatively connect a corresponding Y address conductor of both plates 1 and 2 to read-write drivers 25 and 26, respectively, and the selection of one of these read-write drivers by the application of either a read or write logic pulse thereto will determine which of the corresponding address conductors of plates 1 and 3 is addressed.

Referring to FIG. 1, each of the plate groups 1, 2, 3 and 4; 1', 2', 3' and 4'; and 1'', 2'', 3'' and 4'', etc. corresponds to a binary bit of the digital word information which may be stored in the memory. Under this arrangement, the number of groups would be equal to the number of bits in the digital words stored therein. The number of digital words which could be stored in the memory would be equal to the number of apertured cells in each apertured plate times the number of plates included in each group.

It should be noted that the apertured plate groups are shown in FIGS. 2 and 3 as blocks for the purpose of simplicity and clarity and that the details thereof are shown in FIG. 1. Accordingly, the addressing conductors are shown passing to these apertured plate groups through cabling.

Besides the addressing instrumentation generally described hereinabove in connection with FIG. 2, each group of plates (i.e., plates 1, 2, 3 and 4) have separate but identical sensing and inhibit circuits associated therewith. In FIG. 2, the series connection of third windings 1T3 and 4T3 serves as one input to differential amplifier 27, while the series connection of third windings 2T3 and 3T3 serves as the other input to differential amplifier 27. As described hereinabove, during the reading operation, the addressing of one of the apertured cells may induce a wanted signal plus unwanted half-address noise voltage in one of these inputs and a substantially equal unwanted half-address noise voltage in the other input. The circuit details of differential amplifier 27 will be described in detail hereinafter. Generally described, however, differential amplifier 27 acts to provide a voltage output which is equal to the algebraic sum of voltage input. Since, according to the teachings of the present invention, the half-addressed noise voltage applied to each input terminal of differential amplifier 27 is equal, the noise voltages cancel, and the output voltage will be substantially equal to the wanted signal.

It should be noted that the wanted signal will have a polarity which is determined by whether it was induced in the series connection of third windings 1T3 and 1T4 or 2T3 and 3T3. In order for this wanted signal to have a consistent polarity, it is then passed through a bridge-type detector 28. The details of detector 28 will be described hereinafter. Since the wanted signal has to be converted to a pulse of a fixed width and pulse heighth in order that it be used in computer circuitry (not shown), it is then passed through a strobing amplifier 29 to provide a positive voltage pulse input to a conventional buffer storage 30 when reading a binary "1" condition out of the ferrite apertured memory. Strobing amplifier 29 may be of the type of construction as set forth in copending application 770,667.

Referring to FIG. 4, there are shown two typical hysteresis loops generally defining the flux density B versus magnetomotive force H characteristic for the ferrite memory cells described in the present application. Therein, the positive remanent magnetic condition represents a binary "0" condition, and the negative remanent magnetic condition represents a binary "1" condition. As those skilled in the art will recognize, this selection is arbitrary, and they could have been reversed. However, once the selection is made, it does determine such design considerations as to the polarity of the read and write address pulses and the polarity of the logic circuitry in the inhibit and sense instrumentation.

Buffer storage 30 may be a conventional positive logic latch circuit. Therefore, when buffer storage 30 receives a positive pulse from strobing amplifier 29, it is driven to its set condition with its 1 output terminal going to an up voltage level and its 0 output terminal going to a down output voltage. It will remain in this condition until a reset pulse is applied to its reset input terminal. As shown, buffer storage 30 provides both an input into a computer (not shown), in which the readout binary information may be used, and an input to inhibit drivers 31 and 32 via conventional AND circuits 34 and 35.

When a binary "1" has been read out from the memory during the reading cycle and stored in buffer 30, a down voltage level is passed from buffer 30 to AND circuits 34 and 35 on the application of a write timing pulse to the other input of AND circuits 33 and 34. During the writing cycle, no inhibit pulse is derived by the inhibit drivers 31 and 32, and a binary "1" is written back into the memory in the coincidentally addressed apertured cell. Had a binary "0" been stored in buffer 30, a positive voltage pulse would have been applied to inhibit drivers 31 and 32 when the write timing pulse was applied to AND circuits 34 and 35. Since the coincidentally addressed apertured cell may be located in either plates 1, 2, 3 or 4 during the write cycle, both inhibit drivers 31 and 32 must apply an inhibit current pulse to the third winding of each.

As described in connection with FIG. 2, plates 1, 2, 3 and 4 store only the first bit of each binary word stored in the memory, similar readout and write instrumentation would be required for each group of plates 1', 2', 3' and 4'; 1'', 2'', 3'' and 4'', etc. If there are 24 bits in the binary words to be stored in the memory, then 24 sets of sense and inhibit instrumentation are required to operate with each group of plates. As will be obvious to those skilled in the art, this requirement greatly effects the total component count for the complete system. In addition to the other teachings of the present invention as set forth hereinabove, the present invention also contemplates reducing the required readout and writing instrumentation by storing half of the binary bits making up a digital word in the one group of ferrite apertured plates and half of the binary bits of the same digital word in another group of ferrite apertured plates so that the information therein may be read out on a time-sharing basis.

Specifically, referring to FIG. 3, there is shown a group of ferrite apertured plates 1A, 1B, 2A and 2B. Behind 1A and 2A are identical plates each corresponding to the remaining binary bits making up the first half of the digital words which might be stored in those apertured plates. Behind apertured plates 1B and 2B are identical plates each corresponding to the remaining binary bits making up the second half of the digital words which might be stored in those apertured plates. For example, if it is desired to have a memory which accommodates digital words having 24 bits, there would be eleven additional apertured plates behind plates 1A, 1B, 2A and 2B. Following this arrangement, there will be twelve groups of plates 1A, 1B, 2A and 2B; 1A', 1B', 2A', 2B', etc. (not shown) each requiring a readout and inhibit instrumentation similar to that shown in FIG. 3. Therefore, when an apertured cell in plate 1A is coincidentally addressed and the third windings of plates 1A, 1B, 2A and 2B are connected, as shown, differential amplifier 27 will receive two inputs: one including the wanted signal representing the binary condition (if present) plus a half-addressed noise voltage, one receiving only an equal half-addressed noise voltage.

The differential amplifier 27 then passes the wanted signal through bridge amplifier 28 and strobing amplifier 29 in the same manner described above in conection with FIG. 2 so as to derive a logic pulse in accordance with the binary condition which was stored within the coincidentally addressed apertured cell of plate 1A. This logic pulse is then applied to two positive AND circuits 37 and 38 for the purpose of selecting either buffer storage 30A or 30B for storage, depending upon whether an apertured cell of plates 1A or 1B has been coincidentally addressed. Assuming in the first instance an apertured cell in plate 1A is coincidentally addressed, the first logic pulse (if present) would be stored in buffer 30A. Immediately after coincidentally addressing an apertured cell in plate 1B, a corresponding apertured cell in plate 1B may be coincidentally addressed, and a logic pulse may be read from that memory position so as to be stored in a like maner in buffer 30B via AND circuit 38.

Accordingly, two reading cycles are required. During reading cycle A when an apertured cell in plate 1A is coincidentally addressed and a timing pulse is applied to AND circuit 37 via terminal 39, the binary condition being read out is stored in buffer 30A. During reading cycle B when an apertured cell in plate 1B is coincidentally addressed and a timing pulse is applied to AND circuit 38 via terminal 40, the binary condition being read out is stored in buffer 30B. Similarly during reading cycle A, when an apertured cell in plate 2A is coincidentally addressed and a timing pulse is applied to AND circuit 37 via terminal 39, the binary condition being read out is stored in buffer 30A. Likewise, during reading cycle B, when an apertured cell in plate 2B is coincidentally addressed and a timing pulse is applied to AND circuit 38 via terminal 40, the binary condition being read out is stored in buffer 30B.

Differential amplifier 27, bridging amplifier 28 and strobing amplifier 29 of FIG. 3 are identical in construction and operation with those similarly identified in FIG. 3. AND circuits 37 and 38 may be conventional positive logic AND circuits. Likewise, buffer storage devices 30A and 30B may be conventional positive logic latch circuits identical with buffer 30 of FIG. 2. Buffer 30A provides an input to a computer (not shown) from its 1 output terminal and an input to AND circuit 34 via its 0 output terminal. Similarly, buffer 30B provides an input to the same computer from its 1 output terminal and an input to AND circuit 33 via its 0 output terminal. When buffer 30A and/or buffer 30B receive a positive logic pulse from the output of strobe amplifier during the reading cycle, they are driven to their set condition with a high output voltage level appearing at the 1 output terminal and a low voltage level appearing at the 0 output terminal. They will remain in this condition until a reset pulse is applied to terminals 87 and 88 immediately following the writing cycle.

While time-sharing is utilized in FIG. 3 during the reading of a whole digital word from the memory and half of a word at one time, the same digital word may be written back into storage from buffers 30A and 30B simultaneously if the write timing pulse is applied to AND circuits 34 and 33 at the same time that the corresponding apertured cells in plates 1A and 1B are simultaneously, coincidentally addressed. In summary, because this time-sharing technique requires only one readout (sensing) and inhibit instrumentation for each group of plates 1A, 1B, 2A and 2B (1A', 1B', 2A' and 2B', etc.) and only twelve of these groups of ferrite apertured plates are required for a twenty-four bit digital word, a considerable saving in instrumentation circuits is obtained at the sacrifice of half the capacity of the memory described in connection with FIG. 2. In addition, the memory of FIG. 3 also utilizes only one-half of the number of apertured plates as that of FIG. 2.

Referring to FIG. 1, the third windings, which serve both a sense and inhibit function, are shown connected in a manner so that the half-addressed noise voltages may be effectively cancelled within the differential device 27 (FIG. 2) cooperating with each group of plates 1, 2, 3 and 4, etc. By way of example, when an addressing current pulse is simultaneously passed through addressing conductors AX1 and AY1 during the reading cycle, a wanted voltage may be derived in third winding 4T3, because the apertured cell 9, at the upper righthand corner of plate 4, is driven from one magnetic remanent condition to the other. At the same time, every apertured cell having either the same X or Y coordinate will also derive a noise voltage in its corresponding third winding.

For example, when the noise voltage derived by each half-select apertured cell is represented as N, third winding 2T3 will have a noise voltage commensurate with 16N induced therein, third winding 4T3 will have a noise voltage commensurate with 30N induced therein, and third winding 3T3 will have a noise voltage commensurate with 16N induced therein. Accordingly, one input to the differential device will be receiving a total voltage commensurate with the sum of 30N plus the wanted signal, and the other input to the differential device will be receiving an input voltage commensurate with 32N. The differential device 27, which will be described in detail hereinafter, will then provide an output voltage commensurate with the difference of its inputs. It should be noted that the output voltage from the wanted signal is decreased by an amount commensurate with 2N. However, a sufficient portion of the wanted signal commensurate with the binary condition being read out of storage within the coincidentally addressed apertured cell remains so as to provide an appropriate computer logic pulse for storage within latch 30.

Referring again to FIG. 2, the read-write drivers 22, 23, 25 and 26 may be of an identical construction and operation with those described in the above-identified co-pending application 770,667. By way of example, in response to either a read or write logic pulse being applied to terminals 76 or 77, driver 25 will derive an appropriate address current pulse in one of the address conductors AY1–AY16, depending on which transformer switch SY1–SY16 is forwardly biased to an operating condition by the application of a relatively positive voltage from one of the output terminals Y1–Y16 of Y matrix 24. Moreover, as described in the above-identified copending application 770,667, the amplitude of the addressing current pulse being applied to the selected addressing conductor is controlled to a high degree of accuracy by the utilization of a feedback technique with the resistor 41 providing the necessary instantaneous measure of the current amplitude.

Similarly, in response to either a read or write logic pulse being applied to terminals 78 and 79, read-write driver 26 will derive an address current pulse in one of the address conductors AY17–AY32, depending on which transformer switch SY17–SY32 is forwardly biased to an operating condition by a relatively positive voltage from one of the output terminals Y1–Y16 of Y matrix 24.

As shown in FIG. 2, it is one of the teachings of the present invention that although an increased memory capacity was obtained by adding a ferrite apertured plate along each coordinate, and the required number of address conductors and switching transformers is increased by a factor of 2, that the capacity of Y matrix 24 or any equivalent electronic translator does not have to be similarly increased. This is true because although a relatively positive voltage appearing at any one of the output terminals Y1–Y16 will forwardly bias one of the switching transformers SY1–SY16 and a corresponding switching transformer SY16–SY32, an address current pulse is not derived in either of the selected addressing conductors until the read or write logic pulse is applied to either read-write driver 25 or read-write driver 26. Accordingly, the read-write logic pulses participate in the addressing operation.

It should be noted that if the capacity of the memory were further increased by increasing the number of apertured plates including a read-write driver and an appropriate number of addressing conductor-transformer switch combinations, the same Y matrix could be utilized to forwardly bias a corresponding transformer switch into operating condition within each group, while relying on the selective application of read or write logic pulses to the appropriate read-write driver of one of these groups to determine the exact addressing conductor in which an address current pulse is passed. As shown, each transformer switch comprises two primary windings 6 and 7, two steering diodes D1 and D2, and a secondary winding 8.

Furthermore, the addressing technique described hereinabove for the Y coordinate may be utilized in exactly the same manner for the X coordinate. For example, X diode matrix 21 may be utilized for applying a relatively positive voltage to one of its output terminals X1–X16 so as to forwardly bias one of transformer switches SX1–SX16 and a corresponding transformer switch SX17–SX32 to an operative condition. The exact addressing conductor through which the address current pulse is to be passed is then determined by whether read-write driver 22 or read-write driver 23 has a read or write logic pulse applied thereto.

As shown by the use of identical reference numerals, the read-write address instrumentation of the time-sharing embodiment of FIG. 3 is the same as the read-write address instrumentation of the embodiment of FIG. 3 and operates in the same manner.

As indicated hereinabove, the connection of two or more third windings of an apertured plate performing a sense inhibit function in series in the manner shown provides distinct advantages in the cancellation of half-addressed noise voltages. As a result, however, the impedance through which the inhibit drivers 31 and 32 of FIGS. 2 and 3 must pass the inhibit current pulse during the writing cycle is increased by a factor of 2. Accordingly, the maximum voltage which is developed across the third windings during the writing cycle for the purpose of deriving this inhibit current pulse will be proportionally increased.

The significance attributed to this increased inhibit voltage requirement for inhibit drivers 31 and 32 is best realized with reference to the particular construction of differential amplifier 27, as shown in FIG. 5. It should be noted that its input comprises a transformer having one terminal of its input winding 51 connected to third winding 4T3 (which is in series with third winding 2T3) and its other terminal connected to the third winding 3T3 (which is in series with the third winding 2T3). As those skilled in the art will recognize, the transformer will pass to each of its output windings the algebraic sum of the alternating current voltages being applied to the input terminals.

Inasmuch as this algebraic sum voltage is dependent upon the average D.C. voltage level being applied to each of the input terminals of winding 51, care must be taken to assure that the wanted signal appearing at only one of these input terminals at any one time is not lost by the large average D.C. level being applied to that input terminal. For example, if the average D.C. voltage level were such that active electrical elements were driven to a state of saturation by the unwanted portions of the signal, the portion of the input voltage waveform representing the wanted signal would have little or no recognizable effect on these active elements and the signal would be lost. This consideration is rendered particularly important inasmuch as the inhibit voltages applied thereto during the writing cycle are relatively large. Furthermore, whether the input terminals connected to winding 4T3 or 3T3 will receive successive inhibit current pulses is effectively random determined by the character of the digital word being written into storage.

Accordingly, means are shown in the differential amplifier of FIG. 5 to appropriately vary the gain of the amplifier and provide one solution to this problem. Therein, transformer 50 is provided with two output windings 52 and 53 having one common terminal. The other terminal of winding 52 is connected so that the voltage thereon may be applied to the base of transistor Q1, which is connected for operation in a common emitter configuration. Similarly, the other terminal of winding 53 is connected so that the voltage thereon may be applied to the base of transistor Q2, which is also connected for operation in a common emitter configuration.

Proper biasing is provided to the collector of transistor Q1 via resistor 55 from a +D.C. supply voltage and to the collector of transistor Q2 via resistor 56 from a similar +D.C. supply voltage. Proper biasing is provided to the base of both transistors Q1 and Q2 by a voltage divider comprising a series connection of resistor 57 and diode D58 connected between two +D.C. supply voltages. These latter +D.C. supply voltages should be selected so as to differ in magnitude so that diode D58 is forwardly biased. The common terminal of resistor 57 and diode D58 is then connected to the common terminal of secondary windings 52 and 53. As shown, the bias for the emitter of transistor Q1 is provided via series parallel circuit comprising resistor 59, capacitor 60 and resistor 61. Similarly, the bias for the emitter of transistor Q2 is provided via a series parallel circuit comprising resistor 62, capacitor 63 and resistor 64.

Based on the fact that the A.C. voltage gain of a transistor in the common emitter configuration under particular operating conditions is substantially dependent on the ratio of the collector A.C. load impedance and the A.C. impedance between the emitter and A.C. ground, the differential amplifier comprising transistors Q1 and Q2 is designed so that it will have a very low or zero gain at all times except during the reading cycle and a higher and desired gain during the reading cycle. Accordingly, during the reading cycle, a voltage commensurate with that applied to the input of winding 51 connected to 4T3 is passed through transistor Q1 and applied to one terminal of the input winding 65 of additional differential transformer 66, and a voltage commensurate with that applied to the input winding 51 connected to 3T3 is passed through transistor Q2 and applied to the other terminal of input winding 65. However, during all other times (other than during the reading cycle), no voltage is passed through either transistors Q1 or Q2 inasmuch as they are in their low gain or off condition of operation.

As indicated hereinabove, the A.C. gain of transistor Q1 is altered by changing its effective A.C. emitter impedance. This modification of the effective A.C. emitter impedance is in turn accomplished by altering the A.C. voltage level at junction 90. During the low gain (or off condition) the voltage at junction 90 is determined by diode D91 which is maintained in a forwardly biased condition as a result of the voltage level being applied to the gating terminal 92. Meanwhile, transistor Q3, having its collector connected to junction 90, is maintained in its nonconducting condition by having its base-to-emitter junction back biased so as not to affect the voltage level at that point. As shown, this back biasing is obtained as a result of connecting a resistor 95, a zener diode D96 and a diode 94 between a +D.C. supply voltage and an additional gating terminal 97 so that a voltage divider will be formed when the base of transistor Q3 is connected to the common terminal of resistor 95 and zener diode D96. In addition, the junction of zener diode D96 and diode 94 is connected to ground by diode 93 oriented as shown, and the emitter of transistor Q3 is connected to ground through resistor 98. The voltage normally being applied to gating terminal 97 is the same as that being applied to gating terminal 92. During the writing cycle, however, if a voltage gate is applied to both of these terminals (the voltage being applied to terminal 92 being slightly higher than the voltage being applied to terminal 97), normally conducting diode D91 is back biased, and transistor Q3 is driven to its conducting state. As a result, the A.C. voltage at junction 90 is increased, thereby effectively increasing the A.C. emitter impedance of transistor Q1. The gain of transistor Q1 is then appropriately decreased. At the same time that the A.C. gain of transistor Q1 is being decreased during the writing cycle, the voltage at junction 99 in the emitter circuit of transistor Q2 is also modified by the reverse biasing of diode D100 and the conduction of transistor Q4 normally nonconducting. The gating voltages are applied to gating terminals 92 and 97 so as to affect diode D100 and transistor Q4 in the same manner as diode D91 and transistor Q3. As shown, the emitter of transistor Q4 is connected to ground by resistor 101.

As a result of the differential action of transistors Q1 and Q2 in combination with input winding 65 during the reading cycle, the wanted signal of a first polarity is induced in secondary winding 67 when the wanted signal is applied by third winding 4T3 and of the other phase or polarity when the wanted voltage appears on third winding 3T3. Because it is desired that this wanted voltage be converted to a logic pulse having one polarity regardless of which of the third windings on which it was derived, further means generally described in FIGS. 2 and 3 as a bridge amplifier 28 may be utilized to reverse the phase or polarity of the wanted voltage as required. For this purpose, the voltages induced in secondary winding 67 are applied to the base of transistor Q5 connected to operate in a common emitter configuration. As shown, transistor Q5 has its collector biased by a D.C. supply voltage via resistor 68 and its emitter biased by a −D.C. supply voltage via resistors 69 and 70, thereby establishing an operating point. The common terminal of resistors 69 and 70 is connected to ground via capacitor 71 so as to provide a bypass for alternating current to provide the necessary phase or polarity conversion. The collector of transistor Q5 is connected via capacitor 72 to the input winding 73 of a transformer 74.

Transformer 74 is shown with a secondary winding 75 which is center-tapped to provide two legs of an A.C. bridge. The other two legs of an A.C. bridge 76 are provided by a diode D77 and diode D78. With the transformer 74 providing the wanted signal as an input to the bridge, the output of the bridge is sampled by connecting a resistor 79 across the output terminals of the bridge (center tap of winding 75 and the common terminal of diodes D77 and D78). If the center tap of winding 75 is grounded through resistor 102, the output voltage will appear at terminal 103. When the wanted voltage is of one phase or polarity, diode D77 will be forwardly biased. When the wanted voltage is of the other phase or polarity, diode D78 will be forwardly biased. The alteration of the voltage drop across either one of diodes D77 and D78 will modify the voltage applied across resistor 79 with a single phase or polarity in accordance with the magnitude of the wanted signal, regardless of the phase or polarity of the wanted signal.

While the present invention has been described as being particularly beneficial in its application to ferrite apertured plate memory systems, it is emphasized that it may also be utilized in other memory systems exemplified by the toroidal core type. Moreover, from the foregoing it should be clear that the present invention describes a technique which utilizes only one ferrite apertured plate or its equivalent for each bit of a word of digital information which may be stored therein.

In addition, the teachings of the present invention, as described, set forth a technique whereby the capacity of the ferrite memory may be increased as desired by utilizing the ferrite apertured plates in groups of four with their third winding connected so as to cancel undesired half-select address voltages induced therein. Although 16 x 16 apertured cells were included within each plate in the specific embodiment set forth hereinabove, it should be obvious that the number of apertured cells may be varied as desired. Furthermore, all of the apertured cells utilized to define a binary bit of a digital word to be stored might be included within a single supporting plate, and the third winding cooperating with the apertured cells within each quadrant of that plate may be electrically connected for half-address noise voltage cancellation. It would appear that the only realistic design constraint in this regard would be that the same number of apertured cells be included within each quadrant of the supporting plate. Although ferrite apertured cells have been utilized as the memory cell in the above description, it should be noted that any other material having an equivalent hysteresis loop could well have been used.

According to the teachings of the present invention set forth hereinabove, as the capacity of the memory is increased, the complete addressing instrumentation is not increased in direct proportion inasmuch as a technique is shown where the X and Y coordinate matrixes or their equivalents may be utilized to select one address conductor within several groups of addressing conductors along a single coordinate by utilizing plural current drivers as part of the addressing logic. The X and Y matrixes shown herein in block form may be completely conventional in construction, and the details thereof provide no part of the present invention. Reference may be had to pages 57–60 of the textbook entitled Digital Computer Components and Circuits by R. K. Richards, first published November 1957 by D. Van Nostrand Company, Inc., Princeton, New Jersey.

While there have been shown and described and pointed out the fundamental novel features of the invention as applied to a preferred embodiment along with several specific modifications, it will be understood that many additional omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A digital information memory system including two reading cycles for every writing cycle and comprising many ferrite memory cells, each having a positive and negative remanent condition for defining a first and second binary digital condition; said memory cells being arranged along plural parallel planes with said memory cells along each plane being divided into a first, second, third and fourth group, each group having numerically the same number of said memory cells, each of said groups having a third winding which is effectively passed serially through the apertures of said memory cells within each group; said first group of memory cells in each plane corresponding to a binary bit within the first half of the orders of significance of a binary coded word and the second group of memory cells in each plane corresponding to a binary bit within the other half of the orders of significance of a binary coded word having its first half of orders of significance stored in said first group; said third group of memory cells in each plane corresponding to a binary bit within the first half of the orders of significance of a binary coded word; said fourth group of memory cells in each plane corresponding to a binary bit within the other half of the orders of significance of a binary coded word having its first half of orders of significance stored in said third group; plural X address conductors passing serially through the apertures of all the memory cells having an identical X coordinate; plural Y address conductors passing serially through all of the apertures of all of the memory cells having an identical Y coordinate; current driver means for coincidentally passing an address current pulse having a first polarity during the writing cycle and the other polarity during the two reading cycles through both the selected X and Y coordinate conductors passing through one of said memory cells within one of said groups in each parallel plane and half-addressing all of said memory cells having the same Y coordinate; the total flux change within each of said memory cells to which both of said selected X and Y coordinate conductors pass being sufficient to drive each of said memory cells to the magnetic remanent condition corresponding to the first polarity during said writing cycle and to the other magnetic remanent condition corresponding to the other polarity during said two reading cycles; the flux changes within said memory cells being sufficient to drive half-address voltages during said reading and writing cycles within said corresponding third winding without permanently changing its magnetic remanent condition; said first, second, third and fourth groups of memory cells being arranged physically with respect to one another so that when said third winding of said second group of memory cells is connected in series to said third winding of said third group of memory cells and said third winding of said first group of memory cells is connected in series with said third winding of said fourth group of memory cells, an equal total half-address voltage is induced in each; a differential means having one input serially connected to said serially connected third windings of said first and second groups and the other input connected to the serial connection of the third winding of said second and third groups for deriving an output voltage commensurate with the change in magnetic remanent condition of the coincidentally addressed memory cell during said two reading cycles; a first reading storage means connected to receive an output voltage commensurate with the change in magnetic remanent condition of the coincidentally addressed memory cell in said first or third groups during said first reading cycle; a second reading storage means connected to receive an output voltage commensurate with the change in magnetic remanent condition of the coincidentally address memory cell in said second or fourth groups during said second reading cycle; a first inhibit current driver connected to the series connection of said third winding of said second and third groups for deriving, in response to the binary condition of said first read storage means, a current pulse equal in magnitude and opposite in polarity to the current addressing pulse derived by said addressing current driver during said writing cycle in accordance with the binary condition it is desired to store in said second and third groups of memory cells, a second inhibit current driver connected to the series connection of said third winding of said first and fourth groups for deriving, in response to said second read storage means, a current pulse equal in magnitude and opposite in polarity to the current addressing pulse derived by said addressing current driver during said writing cycle in accordance with the binary condition it is desired to store in said first and fourth groups of memory cells.

2. A digital information memory system including a reading and writing cycle comprising many ferrite memory cells, each having a positive and negative remanent condition for defining a first and second binary digital condition; said memory cells being arranged along plural parallel planes with said memory cells along each plane being divided into a first, second, third and fourth group, each group having numerically the same number of said memory cells, each of said groups having a third winding which is effectively passed serially through the apertures of said memory cells within each group; plural X address conductors passing serially through the apertures of all the memory cells having an identical X coordinate; plural Y address conductors passing serially through all of the apertures of all of the memory cells having an identical Y coordinate; current driver means for coincidentally passing an address current pulse having a first polarity during the writing cycle and the other polarity during the reading cycle through both the selected X and Y coordinate conductors passing through one of said memory cells within one of said groups in each parallel plane and half-addressing all of said memory cells having the same Y coordinate; the total flux change within each of said memory cells to which both of said selected X and Y coordinate conductors pass being sufficient to drive each of said memory cells to the magnetic remanent condition corresponding to the first polarity during said writing cycle and to the other magnetic remanent condition corresponding to the other polarity during said reading cycle; the flux changes within said memory cells being sufficient to drive half-address voltages during said reading and writing cycles within said corresponding third winding without permanently changing its magnetic remanent condition; said first, second, third and fourth groups of memory cells being arranged physically with respect to one another so that when said third winding of said third group of memory cells is connected in series to said third winding of said third group of memory cells and said third winding of said first group of memory cells is connected in series with said third winding of said fourth group of memory cells, an equal total half-address voltage is induced in each; a differential means having one input serially connected to said serially connected third windings of said first and second groups and the other input connected to the serial connection of the third windings of said second and third groups for deriving an output voltage commensurate with the change in magnetic remanent condition of the coincidentally addressed memory cell; a first inhibit current driver connected to the series connection of said third winding of said second and third groups for deriving a current pulse equal in magnitude and opposite in polarity to the current addressing pulse derived by said addressing current driver during said writing cycle in accordance with the binary condition it is desired to store in said second and third groups of memory cells; a second inhibit current driver connected to the series connection of said third winding of said first and fourth groups for deriving a current pulse equal in magnitude and opposite in polarity to the current addressing pulse derived by said addressing current driver during said writing cycle in accordance with the binary condition it is desired to store in said first and fourth groups of memory cells.

3. A digital information memory system including a reading and writing cycle comprising many ferrite memory cells, each having a positive and negative remanent condition for defining a first and second binary digital condition; said memory cells being arranged along plural parallel planes with said memory cells along each plane being divided into a first, second, third and fourth group, each group having numerically the same number of said memory cells, each of said groups having a third winding which is effectively passed serially through the apertures of said memory cells within each group; plural X address conductors passing serially through the apertures of all the memory cells having an identical X coordinate; plural Y address conductors passing serially through all of the apertures of all of the memory cells having an identical Y coordinate; each of said memory cells being driven to their positive remanent condition on the application of coincident positive current pulses through the X and Y coordinate conductors passing therethrough, each of said apertured cells being driven to their negative remanent condition on the application of coincident negative current pulses through the X and Y coordinate conductors passing therethrough; current driver means for coincidentally passing an address current pulse having the first polarity during the writing cycle through both the X and Y coordinate conductors passing through one of said memory cells within one of said groups in each parallel plane and half-addressing all of said memory cells having the same X coordinate and all of said memory cells having the same Y coordinate; current driver means for coincidentally passing address current pulses having the other polarity during the reading cycle to both the X and Y coordinate conductors passing through one of said memory cells within one of said groups in each parallel plane and half-addressing all of said memory planes having the same X coordinate and all of said memory cells having the same Y coordinate; the total flux change within each of said memory cells to which both of said X and Y coordinate conductors pass being sufficient to drive each of said memory cells to the magnetic remanent condition corresponding to the first polarity during said writing cycle and to the other magnetic remanent condition corresponding to the other polarity during said reading cycle; the flux changes within said memory cells being sufficient to derive half-address voltages during said read and write cycles within the corresponding third winding without permanently changing its magnetic remanent condition; said first, second, third and fourth groups of memory cells being arranged with respect to one another so that when said third winding of said second group of memory cells is connected in series with said third winding of said third group of memory cells and said third winding of said first group of memory cells is connected in series with said third winding of said fourth group of memory cells, an equal total half-address voltage is induced in each; said induced half-addressed voltages during said writing cycle being opposite in polarity to said half-address induced voltages during said reading cycle, a differential means having two input terminals and one output terminal corresponding to each of said parallel planes, one of said input terminals being connected to said serially connected third winding of said first and fourth groups; the other of said input terminals being connected to the serially connected third windings of said second and third groups; two inhibit current drivers for deriving a current pulse equal in magnitude and opposite in polarity to the current addressing pulse derived by said current driver during said writing cycle; one of said inhibit drivers being connected to the series connection of said third winding of said second and third groups and the other of said inhibit drivers being connected to the series connection of said third winding of said first and fourth groups of the memory cells; during said reading cycle an output voltage will be derived at the output terminal of said differential means when the coincidentally addressed memory cell has one binary condition stored therein and no voltage will be derived in said output terminal when the other binary condition is stored in said coincidentally address memory cell; during said writing cycle said inhibit driver connected to the third winding of said second and third groups being appropriately energized in accordance with said binary condition to be stored in either of said second and third groups of memory cells; during said writing cycle said inhibit driver connected to the third winding of said first and fourth groups being appropriately energized in accordance with said binary condition to be stored in either of said first and fourth groups of memory cells.

4. A digital information memory system for storing words of binary information in two parts comprising a plurality of memory cells defining a first and second binary condition; sense and inhibit winding means connected to said memory cells; sensing means electrically connected to said sense and inhibit winding means; a first and second inhibit driver electrically connected to said sense and inhibit winding means; a first temporary storage means for a bit of binary information from one part of a word; a second temporary storage means for a bit of binary information from the second part of a word; said bit of binary information from the first part of a word being stored in one memory cell; said bit of binary information from the second part of the word being stored within another memory cell; during said read cycle said sensing means electrically connected to said sense and inhibit winding means successively acting to sense and store said bit of binary information from said first part of the word in said first temporary storage means and sense and store said bit of binary information from said second group of the word in said second temporary storage means; during said writing cycle said first and second inhibit drivers responsive to said first and second temporary storage means respectively simultaneously acting to store said bits of binary information from said first and second parts of a word back into appropriate memory cells.

5. A digital information memory system for storing words of binary information in two parts comprising, a plurality of memory cells for defining a first and second binary condition, said plurality of memory cells being divided up into two groups, said first group of memory cells functioning to store a bit of binary information from one part of a word, said second group of memory cells functioning to store a bit of binary information from the second part of a word, energizing means for repetitively addressing any one of plural word locations in said memory, a first sense and inhibit winding means connected to memory cells of said first group, a second sense and inhibit winding means connected to said memory cells of said second group, sensing means electrically connected to said first and second sense and inhibit winding, a first inhibit driver connected to said first sense and inhibit winding means, a second inhibit driver electrically connected to said second sense and inhibit winding means, a first temporary storage means connected to said sensing means for storing a bit of binary information from one part of a word, a second temporary storage means connected to said sensing means for storing a bit of binary information from a second part of a word, during two successive read cycles said sensing means electrically connected to said first and second sense and inhibit winding means successively acting to sense from a memory cell in said first group a bit of binary information from a first part of a word and store that information in said first temporary storage means and then sense from said second group of memory elements a bit of binary information from said second part of the word and store that information in said second temporary storage means, during said writing cycle said first and second inhibit drivers being simultaneously responsive to said first and second temporary storage means respectively so as to store said bits of binary information from said first and second parts of a word back into appropriate memory cells.

References Cited in the file of this patent

UNITED STATES PATENTS

| | | |
|---|---|---|
| 2,849,703 | Bindon et al. | Aug. 26, 1958 |
| 2,911,631 | Warren | Nov. 3, 1959 |

OTHER REFERENCES

"Ferrites Speed," by Brown, Electronic Magazine, April 1953, pp. 146–149.

"Ferrite Plates," by Newhouse et al. from Electronics Engineering, October 10, 1958, pp. 101–103.